(12) United States Patent
Tanaka et al.

(10) Patent No.: US 12,536,396 B2
(45) Date of Patent: Jan. 27, 2026

(54) MAINTENANCE CONTROL DEVICE, SYSTEM, METHOD, AND A NON-TRANSITORY COMPUTER-READABLE STORAGE MEDIUM FOR DETERMINING A MAINTENANCE CONTENT OF A PRINTING APPARATUS

(71) Applicant: SEIKO EPSON CORPORATION, Tokyo (JP)

(72) Inventors: Shinichi Tanaka, Shiojiri (JP); Takuya Yasue, Matsumoto (JP); Junichi Miyake, Matsumoto (JP); Takamu Nakai, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 124 days.

(21) Appl. No.: 18/511,058

(22) Filed: Nov. 16, 2023

(65) Prior Publication Data
US 2024/0160877 A1 May 16, 2024

(30) Foreign Application Priority Data
Nov. 16, 2022 (JP) .................. 2022-183559

(51) Int. Cl.
*G06K 15/00* (2006.01)
(52) U.S. Cl.
CPC .................. *G06K 15/40* (2013.01)

(58) Field of Classification Search
CPC .................. G06K 15/40; B41J 29/393; B41J 2002/16573; B41J 2/165; G06F 3/1229
See application file for complete search history.

(56) References Cited

U.S. PATENT DOCUMENTS

| | | | |
|---|---|---|---|
| 2016/0092848 A1* | 3/2016 | Nakajima | G06Q 10/20 705/305 |
| 2016/0155129 A1* | 6/2016 | Ono | G06Q 30/0202 705/7.31 |
| 2019/0187580 A1* | 6/2019 | Yoshiyama | G03G 15/0233 |
| 2021/0232878 A1* | 7/2021 | Takaoka | G06K 15/4075 |
| 2022/0137906 A1* | 5/2022 | Ogawa | G06F 3/1273 358/1.15 |
| 2022/0305828 A1* | 9/2022 | Usui | B41J 29/393 |
| 2023/0061231 A1* | 3/2023 | Shibata | G06F 3/1258 |

FOREIGN PATENT DOCUMENTS

JP 2014-010393 A 1/2014

\* cited by examiner

*Primary Examiner* — Juan M Guillermety
(74) *Attorney, Agent, or Firm* — Dority & Manning, P.A.

(57) ABSTRACT

A maintenance control system includes a use history acquisition unit that acquires a use history of a printing apparatus, a use state prediction unit that predicts a future use state of the printing apparatus based on the use history of the printing apparatus acquired by the use history acquisition unit, and a maintenance content determination unit that determines a maintenance content of the printing apparatus based on a prediction result predicted by the use state prediction unit.

13 Claims, 6 Drawing Sheets

| THE NUMBER OF PASSES | MAINTENANCE CONTENT | |
|---|---|---|
| | FIRST COMPONENT | SECOND COMPONENT |
| LESS THAN PT11 | — | — |
| PT11 TO PT12 | REPLACEMENT | — |
| PT12 TO PT13 | REPLACEMENT | REPLACEMENT |
| PT13 OR MORE | COLLECTION | |

| ENERGIZATION TIME | MAINTENANCE CONTENT | |
|---|---|---|
| | FIRST ELECTRONIC COMPONENT | SECOND ELECTRONIC COMPONENT |
| LESS THAN ET11 | — | — |
| ET11 TO ET12 | REPLACEMENT | — |
| ET12 OR MORE | REPLACEMENT | REPLACEMENT |

MAINTENANCE CONTROL DEVICE, SYSTEM, METHOD, AND A NON-TRANSITORY COMPUTER-READABLE STORAGE MEDIUM FOR DETERMINING A MAINTENANCE CONTENT OF A PRINTING APPARATUS

The present application is based on, and claims priority from JP Application Serial Number 2022-183559, filed Nov. 16, 2022, the disclosure of which is hereby incorporated by reference herein in its entirety.

BACKGROUND

1. Technical Field

The present disclosure relates to a maintenance control device for a printing apparatus configured to perform printing, a maintenance control system, a maintenance control method, and a non-transitory computer-readable storage medium storing a program.

2. Related Art

For example, JP-A-2014-10393 discloses a diagnostic system for diagnosing reuse of an electronic device based on history information relating to problems that have occurred in the past in the electronic device and a diagnostic condition for evaluating the reuse of the electronic device. When the electronic device has been used, it is possible to perform diagnosis regarding the reuse of the electronic device with high accuracy using such a diagnosis system.

However, in such a system, although the diagnosis is performed based on history information related to problems that have occurred in the past, an event after the diagnosis is not considered, and it is desired to further improve the accuracy.

SUMMARY

According to an aspect of the present disclosure, there is provided a maintenance control device including a use history acquisition unit configured to acquire a use history of a printing apparatus, a use state prediction unit configured to predict a future use state of the printing apparatus based on the use history of the printing apparatus acquired by the use history acquisition unit, and a maintenance content determination unit configured to determine a maintenance content of the printing apparatus based on a prediction result predicted by the use state prediction unit.

According to another aspect of the present disclosure, there is provided a maintenance control system including a use history acquisition unit configured to acquire a use history of a printing apparatus, a use state prediction unit configured to predict a future use state of the printing apparatus based on the use history of the printing apparatus acquired by the use history acquisition unit, and a maintenance content determination unit configured to determine a maintenance content of the printing apparatus based on a prediction result predicted by the use state prediction unit.

According to another aspect of the disclosure, there is provided a maintenance control method that causes one or more computers to perform acquiring a use history of a printing apparatus, predicting a future use state of the printing apparatus based on the use history of the printing apparatus, and determining a maintenance content of the printing apparatus based on the future use status of the printing apparatus.

According to another aspect of the present disclosure, there is provided a non-transitory computer-readable storage medium storing a program that causes one or more computers to perform acquiring a use history of a printing apparatus, predicting a future use state of the printing apparatus based on the use history of the printing apparatus, and determining a maintenance content of the printing apparatus based on the future use state of the printing apparatus.

DESCRIPTION OF EMBODIMENTS

First Embodiment

Hereinafter, a maintenance control device, a maintenance control system, a maintenance control method, and a program according to an embodiment will be described with reference to the drawings. The maintenance control device and the maintenance control system are configured to perform control related to maintenance content of a printing apparatus.

Maintenance Control System 10

Figure 1:
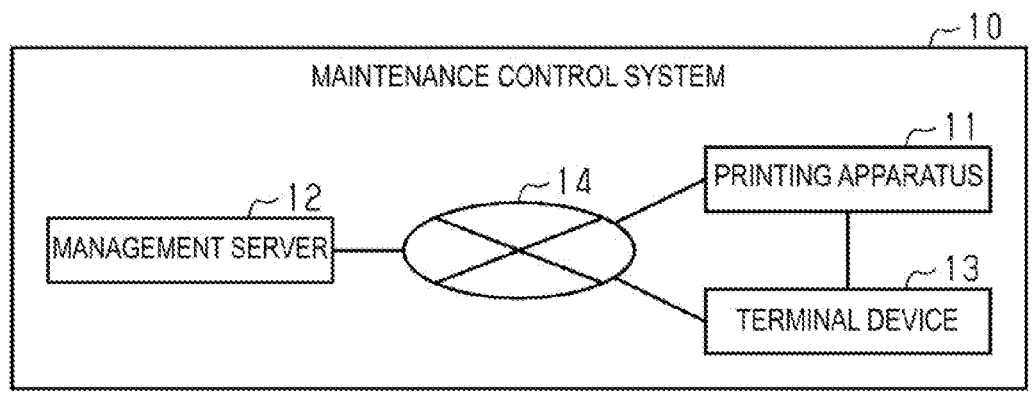
FIG. 1 is a schematic diagram illustrating a maintenance control system.

As illustrated in FIG. 1, a maintenance control system 10 may include a printing apparatus 11, a management server 12, and a terminal device 13. The maintenance control system 10 may include one or more printing apparatuses 11. The maintenance control system 10 may include one or more management servers 12. The maintenance control system 10 may include one or more of terminal devices 13.

The printing apparatus 11, the management server 12, and the terminal device 13 may be communicatively coupled to each other via a network 14. The printing apparatus 11 and the terminal device 13 may be communicatively coupled to each other without using the network 14.

The printing apparatus 11 is configured to perform printing on a medium. The printing apparatus 11 may be configured to perform the printing on a medium by ejecting a liquid on the medium. The printing apparatus 11 may be an ink jet printer configured to eject ink as the liquid.

The management server 12 performs control related to maintenance content of the printing apparatus 11. The management server 12 is configured to determine the maintenance content of the printing apparatus 11. The management server 12 may be a device capable of identifying a use state of the printing apparatus 11. The management server 12 may determine the maintenance content of the printing apparatus 11 based on the use state of the printing apparatus 11. The management server 12 functions as an example of a maintenance control device.

The terminal device 13 may be a device for inputting a confirmation result of the printing apparatus 11. The terminal device 13 may be configured to notify the maintenance content of the printing apparatus 11. The terminal device 13 may be a device different from a device for instructing the printing apparatus 11 to perform printing.

Printing Apparatus 11

Figure 2:
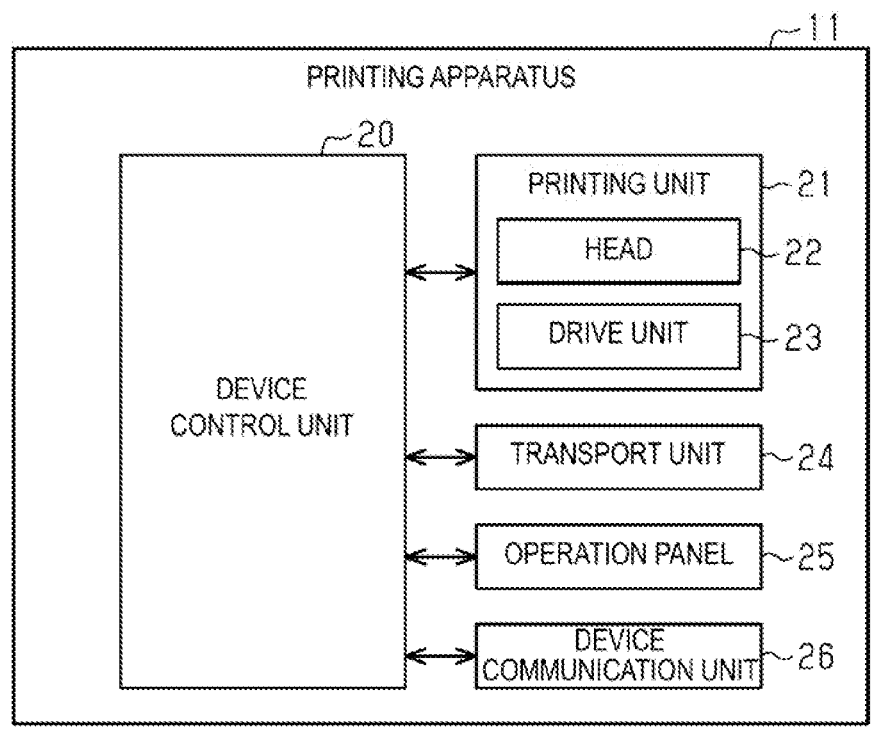
FIG. 2 is a block diagram illustrating an electrical configuration of a printing apparatus.

As illustrated in FIG. 2, the printing apparatus 11 includes a device control unit 20. The device control unit 20 controls the printing apparatus 11. The device control unit 20 controls various operations performed in the printing apparatus 11. The device control unit 20 may be configured as a circuit including α: one or more processors that perform a variety of processing according to a computer program, one or more dedicated hardware circuits that perform at least a part of the variety of processing, or γ: a combination thereof. The hardware circuit is, for example, an application-specific integrated circuit. The processor includes a CPU and a storage medium such as a RAM and a ROM. The storage medium is configured to store a program code or a command configured to cause the CPU to perform the processing. The storage medium includes any medium that can be accessed by a general purpose or special purpose computer.

The printing apparatus 11 includes a printing unit 21. The printing unit 21 is configured to perform printing on a medium. The printing unit 21 includes a head 22. The head 22 can eject a liquid onto the medium. The head 22 includes a plurality of nozzles (not illustrated). Each of the plurality of nozzles can eject the liquid.

The printing unit 21 may include a carriage (not illustrated). The carriage is configured to support the head 22. The carriage can reciprocate in a width direction of the medium. As described above, the head 22 is configured as a serial type, but may be configured as a line type. In the serial type, recording is performed while the head 22 moves in the width direction of the medium. In the line type, the head 22 extends in the width direction of the medium.

The printing unit 21 includes a drive unit 23. The drive unit 23 is a driving source that reciprocates the carriage in the width direction of the medium. The drive unit 23 may be a motor.

The printing apparatus 11 includes a transport unit 24. The transport unit 24 is configured to transport the medium in a transport direction. The transport direction intersects the width direction of the medium. The printing apparatus 11 includes a support unit (not illustrated). The support unit is provided at a position facing the head 22. The transport unit 24 is configured to transport the medium to the support unit. The transport unit 24 includes various rollers (not illustrated). The various rollers are rollers for transporting the medium. The transport unit 24 includes a roller drive unit (not illustrated). The roller drive unit is a driving source of various rollers and may be various motors.

The printing apparatus 11 includes an operation panel 25. The operation panel 25 includes an operation unit and a display unit (not illustrated). The operation unit can be operated by a user. The display unit is capable of displaying information related to printing. The operation panel 25 may be a touch panel.

The printing apparatus 11 includes a device communication unit 26. The device communication unit 26 performs control related to communication between the printing apparatus 11 and another device. The device communication unit 26 transmits and receives data to and from a device of a coupling destination. The device control unit 20 and the device communication unit 26 transmit various types of data to each other.

Management Server 12

Figure 3:
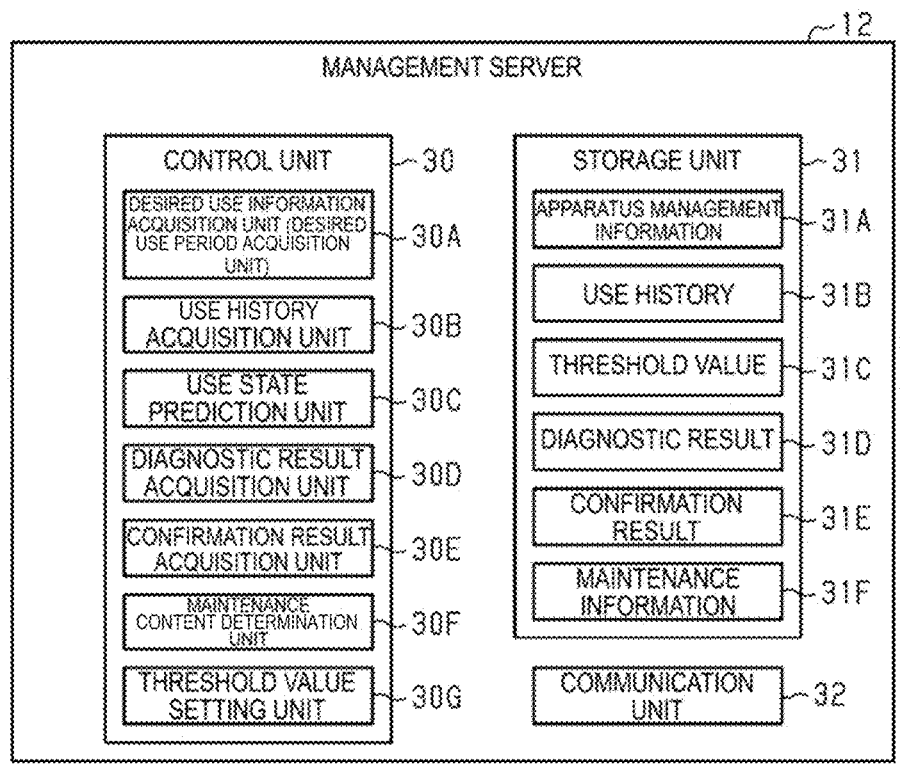
FIG. 3 is a block diagram illustrating an electrical configuration of a management server device.

As illustrated in FIG. 3, the management server 12 includes a control unit 30, a storage unit 31, and a communication unit 32. The control unit 30 comprehensively controls the management server 12. The control unit 30 reads a variety of data from the storage unit 31. The control unit 30 stores a variety of data in the storage unit 31. The control unit 30 may include an operational device and a main storage medium. In particular, the control unit 30 is configured to manage information. Functions of the control unit 30 will be described below in detail.

The storage unit 31 stores information controlled by the management server 12. The storage unit 31 may be a sub-storage medium. The storage unit 31 stores various programs and data necessary for execution of processing by the control unit 30. Functions of the storage unit 31 will be described below in detail.

The communication unit 32 performs control related to communication between the management server 12 and other devices. The communication unit 32 transmits and receives data to and from a device of a coupling destination. The control unit 30 and the communication unit 32 transmit a variety of data to each other.

Terminal Device 13

Figure 4:
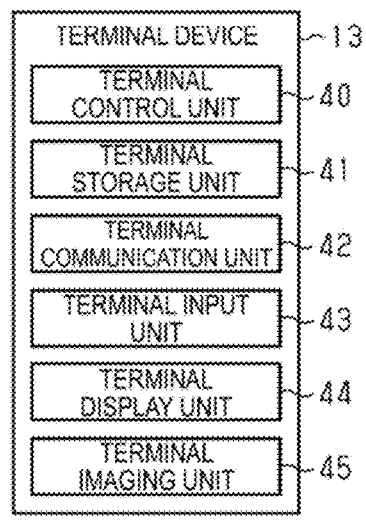
FIG. 4 is a block diagram illustrating an electrical configuration of a terminal device.

As illustrated in FIG. 4, the terminal device 13 includes a terminal control unit 40, a terminal storage unit 41, a terminal communication unit 42, a terminal input unit 43, and a terminal display unit 44. The terminal control unit 40 comprehensively controls the terminal device 13. The terminal control unit 40 reads a variety of data from the terminal storage unit 41. The terminal control unit 40 stores a variety of data in the terminal storage unit 41.

The terminal control unit 40 may include an operational device and a main storage medium. The operational device is one or more circuits and is, for example, a CPU. The operational device loads various programs into the main storage medium. The operational device performs various instructions in accordance with various programs retrieved from the main storage medium. It can be said that various programs cause one or more computers to perform a variety of processing.

The terminal storage unit 41 stores information controlled by the terminal device 13. The terminal storage unit 41 may be a sub-storage medium. The terminal storage unit 41 stores various programs and data necessary for execution of processing by the terminal control unit 40.

The terminal communication unit 42 performs control related to communication between the terminal device 13 and another device. The terminal communication unit 42 transmits and receives data to and from a device of a coupling destination. The terminal control unit 40 and the terminal communication unit 42 transmit various types of data to each other.

The terminal input unit 43 allows an operator to perform an input operation. The terminal input unit 43 may be, for example, a keyboard and a mouse, but is not limited thereto as long as it can allow the operator to perform an input operation. The terminal input unit 43 is configured to output input information to the terminal control unit 40. The terminal display unit 44 is configured to display an image. The terminal display unit 44 displays an image based on image information input from the terminal control unit 40.

The terminal device 13 may include a terminal imaging unit 45. The terminal imaging unit 45 captures an image. The terminal imaging unit 45 may be capable of imaging an exterior or the like of the printing apparatus 11. As a specific example, the terminal imaging unit 45 may be capable of imaging an opening and closing cover of the printing apparatus 11. The terminal imaging unit 45 may be capable of imaging a print result printed by the printing apparatus 11.

Functions of Management Server 12

Here, functions of the management server 12 will be described with reference to FIG. 3.

As illustrated in FIG. 3, the control unit 30 functions as various functional units by executing control programs. The control unit 30 includes a desired use information acquisition unit 30A. The desired use information acquisition unit 30A is configured to acquire desired use information of the user when a diagnostic condition of the printing apparatus 11 is satisfied. In particular, the desired use information acquisition unit 30A acquires, as the desired use information of the user, whether the user desires to continuously use the printing apparatus 11 and a desired use period during which the user desires to continuously use the printing apparatus 11. That is, the desired use information acquisition unit 30A acquires a future desired use period of the printing apparatus 11. The desired use information acquisition unit 30A may acquire the desired use information of the user through communication with the printing apparatus 11, or may acquire the desired use information of the user through communication with the terminal device 13. Further, the desired use information acquisition unit 30A functions as a desired use period acquisition unit.

The control unit 30 includes a use history acquisition unit 30B. The use history acquisition unit 30B is configured to acquire a use history 31B of the printing apparatus 11. The use history 31B of the printing apparatus 11 corresponds to an example of a current use value related to the use of the printing apparatus 11.

The use history 31B of the printing apparatus 11 may include the number of passes of the carriage. The number of passes of the carriage indicates the cumulative number of times that the carriage reciprocates in the width direction of the medium. That is, the number of passes of the carriage is an example of an amount of printing performed by the printing apparatus 11. Hereinafter, the number of passes of the carriage will be simply referred to as the number of passes.

The use history 31B of the printing apparatus 11 may include an energization time of the printing apparatus 11. The energization time of the printing apparatus 11 may be a cumulative time during which the printing apparatus 11 is activated, or may be a cumulative time excluding a standby time in the time during which the printing apparatus 11 is activated.

The use history 31B of the printing apparatus 11 may include a use period of the printing apparatus 11. The use period of the printing apparatus 11 is a period elapsed from start of the use of the printing apparatus 11. In this way, the use history acquisition unit 30B may be able to acquire a plurality of types of use history 31B different from each other. The number of passes corresponds to an example of a first use history, and the energization time of the printing apparatus 11 corresponds to an example of a second use history.

The control unit 30 includes a use state prediction unit 30C. The use state prediction unit 30C is configured to predict a future use state of the printing apparatus 11 based on the use history 31B of the printing apparatus 11. Specifically, the use state prediction unit 30C is configured to predict the future use state of the printing apparatus 11 corresponding to the desired use period based on the use period of the printing apparatus 11, the number of passes of the printing apparatus 11, and the energization time of the printing apparatus 11. That is, the use state prediction unit 30C is configured to predict the future use state of the printing apparatus 11 based on the plurality of types of use history 31B. Also, the use state prediction unit 30C is configured to predict a future use value based on the current use value.

The control unit 30 includes a diagnostic result acquisition unit 30D. The diagnostic result acquisition unit 30D is configured to acquire a diagnostic result 31D of the printing apparatus 11. The diagnostic result 31D of the printing apparatus 11 may include a diagnostic result 31D of a driving pulse when the drive unit 23 is driven.

The control unit 30 includes a confirmation result acquisition unit 30E. The confirmation result acquisition unit 30E is configured to acquire a confirmation result 31E of the printing apparatus 11 confirmed by a confirmer. The confirmation result 31E of the printing apparatus 11 may include a print result printed by the printing apparatus 11. The confirmation result 31E of the printing apparatus 11 may include a result indicating abnormality of the exterior recognized by the confirmer. The confirmation result 31E of the printing apparatus 11 may include a captured image captured by the terminal device 13.

The control unit 30 includes a maintenance content determination unit 30F. The maintenance content determination unit 30F is configured to determine the maintenance content of the printing apparatus 11. The maintenance content determination unit 30F may be configured to determine the maintenance content of the printing apparatus 11 based on the future use state of the printing apparatus 11. In particular, the maintenance content determination unit 30F may be configured to determine the maintenance content of the printing apparatus 11 based on whether or not the future use value of the printing apparatus 11 exceeds a threshold value 31C. In addition, the maintenance content determination unit 30F may be configured to determine the maintenance content of the printing apparatus 11 based on the desired use period of the printing apparatus 11. The maintenance content determination unit 30F may be configured to determine the maintenance content of the printing apparatus 11 based on the diagnostic result 31D of the printing apparatus 11.

The maintenance content determination unit 30F may be configured to determine the maintenance content of the printing apparatus 11 based on the confirmation result 31E of the printing apparatus 11. The maintenance content of the printing apparatus 11 determined based on the future use state of the printing apparatus 11 corresponds to an example of a first maintenance content. The maintenance content of the printing apparatus 11 determined based on the confirmation result 31E of the printing apparatus 11 corresponds to an example of a second maintenance content.

The control unit 30 includes a threshold value setting unit 30G. The threshold value setting unit 30G sets a threshold value 31C. The threshold value 31C is a threshold value of the use value relating to the use of the printing apparatus 11.

The storage unit 31 stores device management information 31A. The device management information 31A is management information related to one or more printing apparatuses 11. Specifically, the device management information 31A may include apparatus identification information, communication destination information, a password, user identification information, installation position information, contact information, a mail address, and the like. The apparatus identification information is unique information that can identify the printing apparatus 11.

The storage unit 31 stores the use history 31B. The use history 31B may include the use period, the number of passes, and the energization time of the printing apparatus 11. The use history 31B is stored in the storage unit 31 by being transmitted from the printing apparatus 11 as a result of being counted according to the operation of the printing apparatus 11.

The storage unit 31 stores the threshold value 31C. The threshold value 31C store a threshold value 31C corresponding to the use history 31B. The threshold value 31C may include a pass number threshold value and an energization time threshold value. The pass number threshold value is a threshold value of the number of passes. The energization time threshold value is a threshold value of the energization time. The threshold value 31C may be set in advance by an administrator of the management server 12.

The storage unit 31 stores the diagnostic result 31D. The diagnostic result 31D is information indicating a result of diagnosing the printing apparatus 11. The diagnostic result 31D is transmitted from the printing apparatus 11 and stored in the storage unit 31.

The storage unit 31 stores the confirmation result 31E. The confirmation result 31E is information indicating a result of confirming the printing apparatus 11 by the confirmer. The confirmation result 31E is transmitted from the terminal device 13 and stored in the storage unit 31.

The storage unit 31 stores the maintenance information 31F. The maintenance information 31F is information relating to the maintenance content of the printing apparatus 11. The maintenance information 31F may include a determination table for determining the maintenance content of the printing apparatus 11. The maintenance information 31F may include information indicating a determination result of the maintenance content of the printing apparatus 11.

Determination Table

Next, the determination table will be described with reference to FIGS. 5 and 6. The determination table may include a first determination table shown in FIG. 5 and a second determination table shown in FIG. 6.

Figures 5, 6, 7:
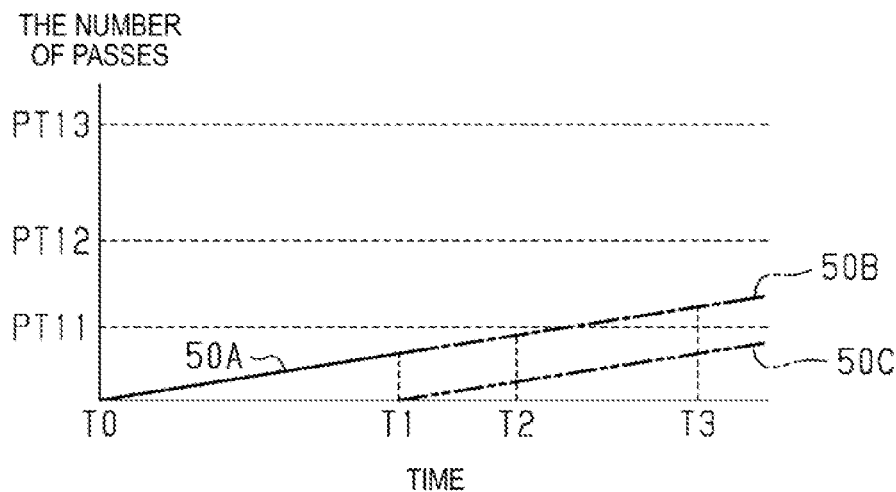
FIG. 5 is a schematic diagram illustrating a first determination table.
FIG. 6 is a schematic diagram illustrating a second determination table.
FIG. 7 is a schematic diagram illustrating a relationship between a use period and the number of passes.

As illustrated in FIG. 5, the first determination table is referred to at a diagnostic timing at which the diagnostic condition of the printing apparatus 11 is satisfied. The diagnostic timing may be when a predetermined period of time has elapsed from the start of use of the printing apparatus 11. The predetermined period of time may be a guarantee period of the printing apparatus 11.

In the first determination table, the number of passes and the maintenance content correspond to each other. The maintenance content includes, for example, replacement of a first component and replacement of a second component. The first component may be the drive unit 23, and the second component may be a belt (not illustrated) for driving the carriage.

More specifically, in the first determination table, when the number of passes is less than a first pass number threshold value PT11, the first component and the second component are not replaced as the maintenance content. When the number of passes is equal to or greater than the first pass number threshold value PT11 and less than a second pass number threshold value PT12, the first component is replaced as the maintenance content, but the second component is not replaced. When the number of passes is equal to or greater than the second pass number threshold value PT12 and less than a third pass number threshold value PT13, the first component and the second component are replaced as the maintenance content. When the number of passes is equal to or greater than the third pass number threshold value PT13, the first component and the second component are not replaced as the maintenance content, and the printing apparatus 11 is collected.

The first pass number threshold value PT11 is a threshold value at which the first component does not necessarily need to be replaced but replacement of the first component is recommended. The second pass number threshold value PT12 is a threshold value at which the first component and the second component do not necessarily need to be replaced, but replacement of the first component and the second component is recommended. The third pass number threshold value PT13 is a threshold value at which collection of the printing apparatus 11 is desired as much as possible. That is, the third pass number threshold value PT13 is a threshold value for determining whether or not to collect the printing apparatus 11 itself regardless of replacement of the components.

As illustrated in FIG. 6, like the first determination table, the second determination table is referred to at the diagnostic timing at which the diagnostic condition of the printing apparatus 11 is satisfied. In the second determination table, the energization time and the maintenance content correspond to each other. The maintenance content includes, for example, replacement of a first electronic component and replacement of a second electronic component. The first electronic component may be an electronic component that is likely to deteriorate over time, and the second electronic component may be an electronic component that is unlikely to deteriorate over time.

More specifically, in the second determination table, when the energization time is less than the first energization time threshold value ET11, the first electronic component and the second electronic component are not replaced as the maintenance content. When the energization time is equal to or longer than the first energization time threshold value ET11 and shorter than the second energization time threshold value ET12, the first electronic component is replaced as the maintenance content, but the second electronic component is not replaced. When the energization time is equal to or greater than the second energization time threshold value ET12, the first electronic part and the second electronic part are replaced as the maintenance content.

The first energization time threshold value ET11 is a threshold value at which the first electronic component does not necessarily need to be replaced but replacement of the first electronic component is recommended. The second energization time threshold value ET12 is a threshold value at which the first electronic component and the second electronic component do not necessarily need to be replaced but replacement of the first electronic component and the second electronic component is recommended.

Mode of Determining Maintenance Content

Next, a mode of determining the maintenance content of the printing apparatus 11 will be described with reference to FIGS. 7 to 10. The maintenance content of the printing apparatus 11 is determined based on the desired use period and the prediction result of the future use state.

As illustrated in FIG. 7, as a specific example, a case in which the use of the printing apparatus 11 starts at a timing indicated by a reference sign TO and the number of passes is increased as indicated by a use history graph 50A will be described. At the timing indicated by the reference sign TO, the number of passes is 0. Although the use history graph 50A is not actually a straight line, it will be described as a straight line to facilitate understanding of the disclosure. Specifically, the use history graph 50A is a straight line coupling a point indicated by the latest cumulative number of passes of the printing apparatus 11 and the use period from the start of use, and a point at the timing indicated by the reference sign TO. The use history 31B of the printing apparatus 11 stored in the storage unit 31 of the management server 12 or information held by the printing apparatus 11 may be used as the latest cumulative number of passes of the printing apparatus 11 and the use period from the start of use. In addition, the use history graph 50A may be a straight line coupling a point indicated by the cumulative number of passes and the use period from the start of use of the printing apparatus 11 at an arbitrary timing and a point at the timing indicated by the reference sign TO. In FIG. 7, when the diagnostic condition is satisfied at the timing indicated by a reference sign T1, the number of passes is less than the first pass number threshold value PT11.

Then, a use prediction graph 50B when the printing apparatus 11 is continuously used is generated based on the use history graph 50A. The use prediction graph 50B is a line obtained by extending the use history graph 50A with the same inclination as the use history graph 50A. The use prediction graph 50B is a prediction result of the future number of passes.

Further, a replacement prediction graph 50C is generated based on the use history graph 50A. The replacement prediction graph 50C is a line obtained by extending the number of passes from 0 starting from the timing indicated by the reference sign T1 with the same inclination as the use history graph 50A. The replacement prediction graph 50C is a prediction result of the future number of passes when the component is replaced at the timing indicated by the reference sign T1.

When the desired use period is from the timing indicated by the reference sign T1 to the timing indicated by the reference sign T2, it is possible to identify that the number of passes is less than the first pass number threshold value PT11 also at the timing indicated by the reference sign T2 based on the use prediction graph 50B. Thus, the non-replacement of the first component and the second component is determined as the maintenance content based on the first determination table.

When the desired use period is from the timing indicated by the reference sign T1 to the timing indicated by the reference sign T3, it is possible to identify that the number of passes is equal to or greater than the first pass number threshold value PT11 and is less than the second pass number threshold value PT12 also at the timing indicated by the reference sign T3 based on the use prediction graph 50B. Thus, replacement of the first component and non-replacement of the second component are determined as the maintenance content based on the first determination table. In addition, based on the replacement prediction graph 50C, it is possible to identify that the number of passes from the component replacement is less than the first pass number threshold value PT11 at the timing indicated by the reference sign T3.

The timing indicated by the reference sign T1 may be five years from the timing indicated by the reference sign TO. The timing indicated by the reference sign T2 may be two years from the timing indicated by the reference sign T1. The timing indicated by the reference sign T3 may be five years from the timing indicated by the reference sign T1.

Figure 8:
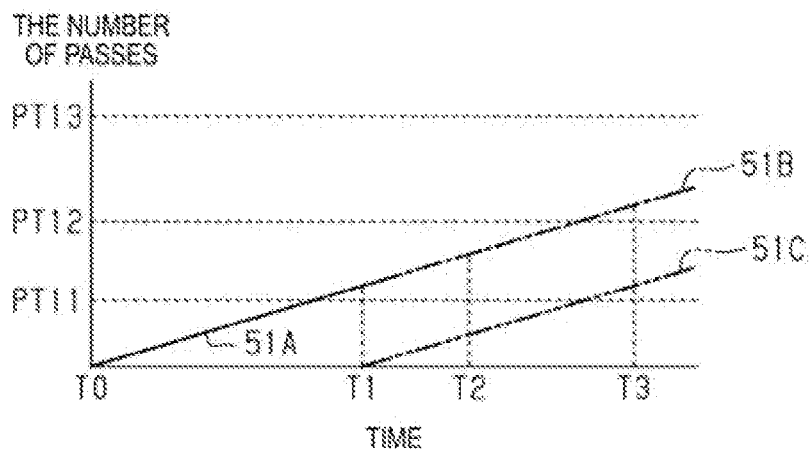
FIG. 8 is a schematic diagram illustrating a relationship between a use period and the number of passes.

Next, as illustrated in FIG. 8, a case in which the number of passes increases as illustrated in the use history graph 51A will be described. FIG. 8 is also described as a linear graph as in FIG. 7. In this case, when the diagnostic condition is satisfied at the timing indicated by the reference sign T1, the number of passes is equal to or greater than the first pass number threshold value PT11 and is less than the second pass number threshold value PT12.

When the desired use period is from the timing indicated by the reference sign T1 to the timing indicated by the reference sign T2, it is possible to identify that the number of passes is equal to or greater than the first pass number threshold value PT11 and is less than the second pass number threshold value PT12 also at the timing indicated by the reference sign T2 based on the use prediction graph 51B. Thus, replacement of the first component and non-replacement of the second component are determined as the maintenance content based on the first determination table. In addition, it is possible to identify that the number of passes from the component replacement is less than the first pass number threshold value PT11 at the timing indicated by the reference sign T2 based on the replacement prediction graph 50C.

When the desired use period is from the timing indicated by the reference sign T1 to the timing indicated by the reference sign T3, it is possible to identify that the number of passes is equal to or greater than the second pass number threshold value PT12 and is less than the third pass number threshold value PT13 at the timing indicated by the reference sign T3 based on the use prediction graph 51B. Thus, the replacement of the first component and the second component is determined as the maintenance content based on the first determination table. In addition, based on the replacement prediction graph 51C, it is possible to identify that the number of passes from the component replacement is equal to or greater than the first pass number threshold value PT11 and is less than the second pass number threshold value PT12 at the timing indicated by the reference sign T3.

Figure 9:
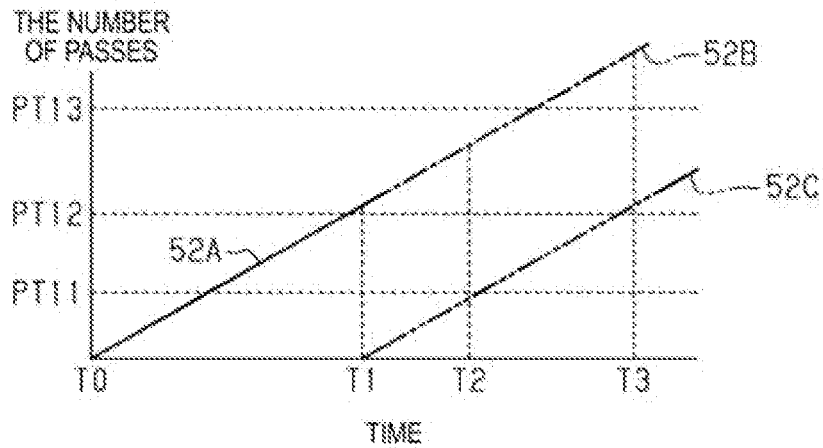
FIG. 9 is a schematic diagram illustrating a relationship between a use period and the number of passes.

Next, as illustrated in FIG. 9, a case in which the number of passes increases as illustrated in the use history graph 52A will be described. Similarly to FIGS. 7 and 8, FIG. 9 is also described as a linear graph. In this case, when the diagnostic condition is satisfied at the timing indicated by the reference sign T1, the number of passes is equal to or greater than the second pass number threshold value PT12 and is less than the third pass number threshold value PT13.

When the desired use period is from the timing indicated by the reference sign T1 to the timing indicated by the reference sign T2, it is possible to identify that the number of passes is equal to or greater than the second pass number threshold value PT12 and is less than the third pass number threshold value PT13 also at the timing indicated by the reference sign T2 based on the use prediction graph 52B. Thus, the replacement of the first component and the second component is determined as the maintenance content based on the first determination table. In addition, it is possible to identify that the number of passes from the component replacement is less than the first pass number threshold value PT11 at the timing indicated by the reference sign T2 based on the replacement prediction graph 52C.

When the desired use period is from the timing indicated by the reference sign T1 to the timing indicated by the reference sign T3, it is possible to identify that the number of passes is equal to or greater than the third pass number threshold value PT13 at the timing indicated by the reference sign T3 based on the use prediction graph 52B. Thus, it is recommended that a period from the timing indicated by the reference sign T1 to the timing indicated by the reference sign T2 be set as the desired use period based on the first determination table. In the use prediction graph 52B, a period predicted to be less than the third pass number threshold value PT13 can be recommended as the desired use period. In addition, it is possible to identify that the number of passes from the component replacement is equal to or greater than the second pass number threshold value PT12 and is less than the third pass number threshold value PT13 at the timing indicated by the reference sign T3 based on the replacement prediction graph 52C. Therefore, when the printing apparatus 11 is continuously used until the timing indicated by the reference sign T3, the condition in which the first component and the second component are replaced may be set again before the timing indicated by the reference sign T3 is reached.

Figure 10:
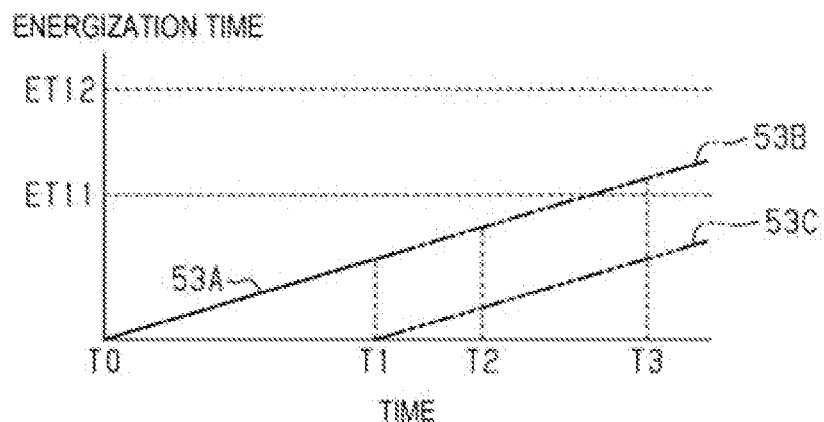
FIG. 10 is a schematic view illustrating a relationship between a use period and an energization time.

As illustrated in FIG. 10, a case in which the use of the printing apparatus 11 starts at the timing indicated by the reference sign TO and the energization time is increased as indicated by the use history graph 53A will be described. Similarly to FIGS. 7 to 9, FIG. 10 is described as a linear graph. In this case, when the diagnostic condition is satisfied at the timing indicated by the reference sign T1, the energization time is less than the first energization time threshold value ET11.

When the desired use period is from the timing indicated by the reference sign T1 to the timing indicated by the reference sign T2, it is possible to identify that the energization time is less than the first energization time threshold value ET11 also at the timing indicated by the reference sign T2 based on the use prediction graph 53B. Thus, the non-replacement of the first electronic component and the second electronic component is determined as the maintenance content based on the second determination table.

When the desired use period is from the timing indicated by the reference sign T1 to the timing indicated by the reference sign T3, it is possible to identify that the energization time is equal to or greater than the first energization time threshold value ET11 and is less than the second energization time threshold value ET12 at the timing indicated by the reference sign T3 based on the use prediction graph 53B. Thus, the replacement of the first electronic component and the non-replacement of the second electronic component are determined as the maintenance content based on the second determination table. In addition, it is possible to identify that the energization time from the component replacement is less than the first energization time threshold value ET11 at the timing indicated by the reference sign T3 based on the replacement prediction graph 53C.

Use History Generation Processing

Here, use history generation processing will be described. The use history generation processing is performed at predetermined intervals by the device control unit 20 in the printing apparatus 11.

In the use history generation processing, the device control unit 20 determines whether or not a generation condition of the use history 31B is satisfied. The generation condition of the use history 31B may include a first generation condition, a second generation condition, and a third generation condition. The first generation condition may be satisfied at a predetermined interval. When the first generation condition is satisfied, the device control unit 20 updates the use period. Thus, the device control unit 20 can identify the use period as the use history 31B.

The second generation condition may be satisfied when the printing apparatus 11 is shut down. When the second generation condition is satisfied, the device control unit 20 counts the energization time and updates the energization time. Thus, the device control unit 20 can identify the energization time as the use history 31B.

The third generation condition may be satisfied when printing based on the print instruction is ended. When the third generation condition is satisfied, the device control unit 20 counts the number of passes in the printing based on the print instruction and updates the number of passes. Accordingly, the device control unit 20 can identify the number of passes as the use history 31B.

The device control unit 20 stores the generated use history 31B in the storage medium of the device control unit 20. Then, when a transmission condition is satisfied, the device control unit 20 transmits the use history 31B and the apparatus identification information to the management server 12. The transmission condition may be satisfied at predetermined intervals. The transmission condition may be satisfied when the diagnostic condition is satisfied. The transmission condition may be satisfied when a transmission request is received from the management server 12.

On the other hand, in the management server 12, the control unit 30 receives the use history 31B and the apparatus identification information from the printing apparatus 11. Then, the control unit 30 stores the use history 31B of the printing apparatus 11 corresponding to the apparatus identification information in the storage unit 31. Thus, the control unit 30 can identify the use history 31B of the printing apparatus 11 corresponding to the apparatus identification information.

Diagnostic Control Processing

Next, a diagnostic control processing will be described with reference to FIG. 11. The diagnostic control processing includes a first diagnostic control processing performed by the printing apparatus 11, a second diagnostic control processing performed by the management server 12, and a third diagnostic control processing performed by the terminal device 13. The first diagnostic control processing is processing performed by the device control unit 20 at a predetermined interval.

Figure 11:
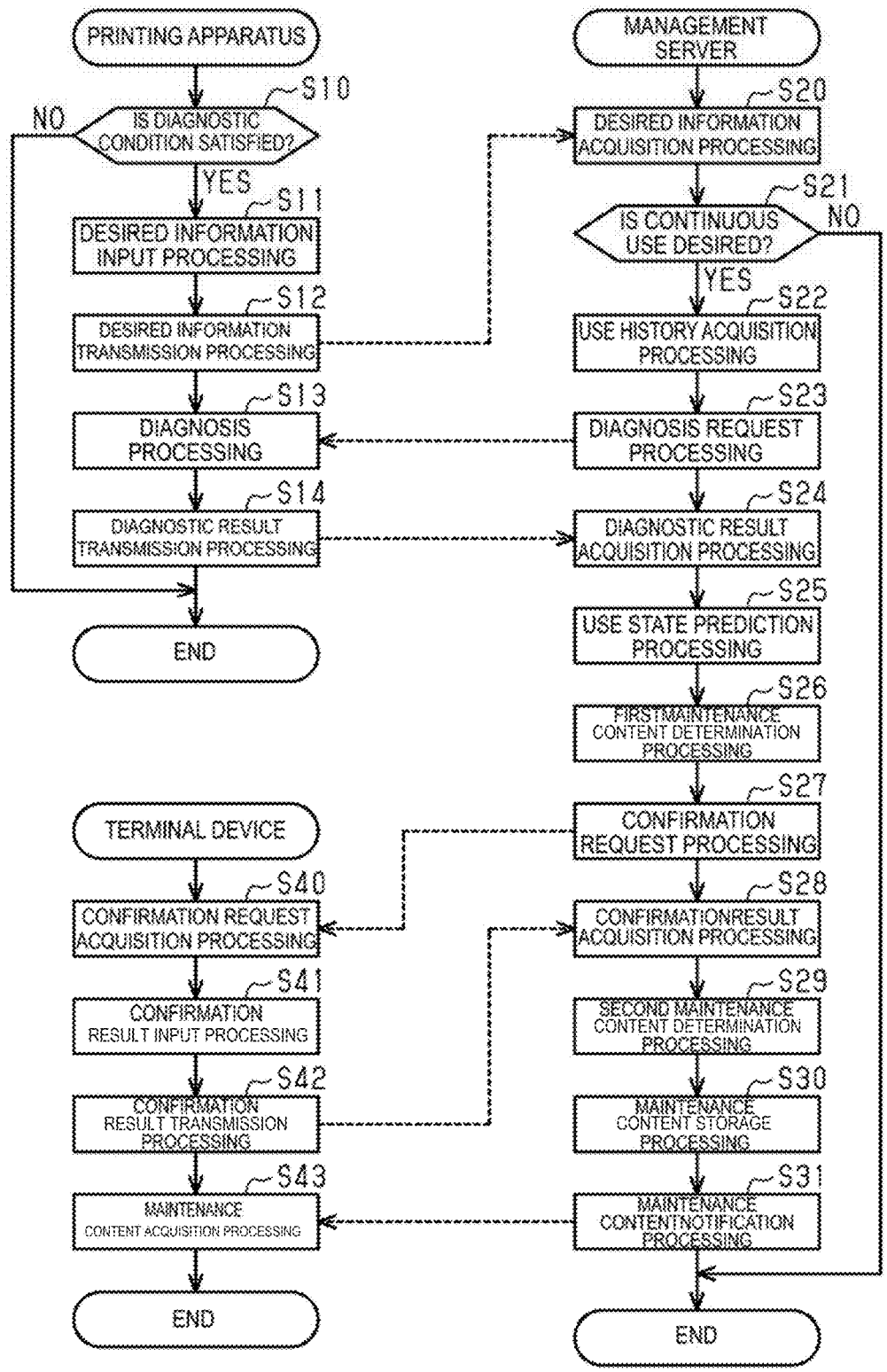
FIG. 11 is a flowchart illustrating diagnostic control processing.

As illustrated in FIG. 11, in the printing apparatus 11, in Step S10, the device control unit 20 determines whether or not the diagnostic condition is satisfied. The diagnostic condition may be satisfied when the use period reaches a predetermined period. In the processing, when it is determined that the diagnostic condition is not satisfied, the device control unit 20 ends the first diagnostic control processing. On the other hand, when the device control unit 20 determines that the diagnostic condition is satisfied, the process proceeds to Step S11.

In Step S11, the device control unit 20 performs desired information input processing. In the processing, the device control unit 20 inputs the desired use information of the user from the operation panel 25. When this processing ends, the device control unit 20 causes the process to proceed to Step S12.

In Step S12, the device control unit 20 performs desired information transmission processing. In the processing, the device control unit 20 transmits the desired use information to the management server 12. Further, the device control unit 20 transmits the apparatus identification information to the management server 12 together with the desired use information. When the processing ends, the device control unit 20 causes the process to proceed to Step S13.

In the management server 12, in Step S20, the control unit 30 performs desired information acquisition processing. In the processing, the control unit 30 receives the desired use information and the apparatus identification information from the printing apparatus 11. Thus, the control unit 30 acquires the desired use information and the apparatus identification information from the printing apparatus 11. In particular, the control unit 30 acquires a future desired use period of the printing apparatus 11. Then, the control unit 30 stores the desired use information corresponding to the apparatus identification information in the storage unit 31. The control unit 30 that performs such processing functions as an example of a desired use information acquisition unit 30A and a desired use period acquisition unit. When the processing ends, the control unit 30 causes the process to proceed to Step S21.

In Step S21, the control unit 30 determines whether or not continuous use is desired based on the desired use information. When it is determined that the continuous use of the printing apparatus 11 is not desired, the control unit 30 ends the second diagnostic control processing. In such a case, the control unit 30 stores information indicating collection of the printing apparatus 11 in the storage unit 31 and transmits the information indicating collection of the printing apparatus 11 and the apparatus identification information to the terminal device 13. Thus, the collection of the printing apparatus 11 corresponding to the apparatus identification information is performed. On the other hand, when the control unit 30 determines that the continuous use of the printing apparatus 11 is desired, the process proceeds to Step S22.

In Step S22, the control unit 30 performs use history acquisition processing. In the processing, the control unit 30 reads the use history 31B of the printing apparatus 11 from the storage unit 31 and acquires the use history 31B of the printing apparatus 11. In particular, the control unit 30 acquires the current use value as the use history 31B of the printing apparatus 11. Specifically, the control unit 30 acquires the use period of the printing apparatus 11, the number of passes of the printing apparatus 11, and the energization time of the printing apparatus 11. The use period of the printing apparatus 11 may correspond to a period during which the diagnostic condition is satisfied. The control unit 30 that performs such processing functions as an example of the use history acquisition unit 30B. When the processing ends, the control unit 30 causes the process to proceed to Step S23.

In Step S23, the control unit 30 performs diagnosis request processing. In the processing, the control unit 30 transmits a diagnosis request to the printing apparatus 11 corresponding to the acquired apparatus identification information. When the processing ends, the control unit 30 causes the process to proceed to Step S24.

In the printing apparatus 11, the device control unit 20 performs diagnostic processing in Step S13. In the processing, the device control unit 20 diagnoses the printing apparatus 11. As a specific example, the device control unit 20 may diagnose a driving pulse when the drive unit 23 is driven. When the processing ends, the device control unit 20 causes the process to proceed to Step S14.

In Step S14, the device control unit 20 performs diagnostic result transmission processing. In the processing, the device control unit 20 transmits a diagnostic result 31D to the management server 12. Further, the device control unit 20 transmits the apparatus identification information to the management server 12 together with the diagnostic result 31D. When the processing ends, the device control unit 20 ends the first diagnostic control processing.

In the management server 12, in Step S24, the control unit 30 performs diagnostic result acquisition processing. In the processing, the control unit 30 receives the diagnostic result 31D and the apparatus identification information from the printing apparatus 11. Thus, the control unit 30 acquires the diagnostic result 31D and the apparatus identification information of the printing apparatus 11. The control unit 30 that performs such processing functions as the diagnostic result acquisition unit 30D. Then, the control unit 30 stores the diagnostic result 31D corresponding to the apparatus identification information in the storage unit 31. When the processing ends, the control unit 30 causes the process to proceed to Step S25.

In Step S25, the control unit 30 performs use state prediction processing. In the processing, the control unit 30 predicts the future use state of the printing apparatus 11 based on the use history 31B of the printing apparatus 11.

Specifically, the control unit 30 predicts the future use state corresponding to the desired use period based on the use history 31B of the printing apparatus 11.

In particular, the control unit 30 predicts a future use value as the future use state of the printing apparatus 11 based on the current use value. The control unit 30 predicts the future number of passes of the printing apparatus 11 based on the use period of the printing apparatus 11, the desired use period of the printing apparatus 11, and the number of passes of the printing apparatus 11. The control unit 30 predicts a future energization time of the printing apparatus 11 based on the use period of the printing apparatus 11, the desired use period of the printing apparatus 11, and the energization time of the printing apparatus 11.

As a specific example, the control unit 30 generates the use prediction graphs 50B to 53B based on the use history graphs 50A to 53A corresponding to the use history 31B of the printing apparatus 11. The control unit 30 generates the replacement prediction graphs 50C to 53C based on the use history graphs 50A to 53A corresponding to the use history 31B of the printing apparatus 11. Then, the control unit 30 predicts the future use value by acquiring the future use value corresponding to the desired use period based on the use prediction graphs 50B to 53B and the replacement prediction graphs 50C to 53C. The control unit 30 that performs such processing functions as an example of the use state prediction unit 30C. When the processing ends, the control unit 30 causes the process to proceed to Step S26.

In Step S26, the control unit 30 performs first maintenance content determination processing. In the processing, the control unit 30 determines the maintenance content of the printing apparatus 11 based on the future use state of the printing apparatus 11. In particular, the control unit 30 determines the maintenance content of the printing apparatus 11 based on whether or not the future use value exceeds the threshold value 31C.

In addition, the control unit 30 determines the maintenance content of the printing apparatus 11 based on the future desired use period of the printing apparatus 11. In particular, the control unit 30 can determine different maintenance content of the printing apparatus 11 according to whether the future desired use period of the printing apparatus 11 is a first desired use period or a second desired use period different from the first desired use period. As a specific example, the first desired use period may be two years and the second desired use period may be five years.

Further, when the future number of passes in the desired use period is equal to or greater than the third pass number threshold value PT13, the control unit 30 may notify the printing apparatus 11 or the terminal device 13 of a recommendation to shorten the desired use period. As a specific example, although the desired use period is five years, the control unit 30 may notify a recommendation to shorten the desired use period to two years. When the future number of passes in the desired use period is equal to or greater than the third pass number threshold value PT13, the control unit 30 may notify the printing apparatus 11 or the terminal device 13 of collection of the printing apparatus 11.

The control unit 30 also determines the maintenance content of the printing apparatus 11 based on the diagnostic result 31D of the printing apparatus 11. As a specific example, when the diagnostic result 31D indicating that there is an abnormality is acquired based on the driving pulse when the drive unit 23 is driven, the control unit 30 may determine the replacement of the first component and the second component as the maintenance content. In such a case, the control unit 30 may compositely determine the maintenance content determined based on the future use state of the printing apparatus 11 and the maintenance content based on the diagnostic result 31D as the first maintenance content. In addition, the control unit 30 may cancel the maintenance content determined based on the future use state of the printing apparatus 11 and may preferentially determine the maintenance content based on the diagnostic result 31D. In addition, the control unit 30 may cancel the maintenance content based on the diagnostic result 31D and may preferentially determine the maintenance content determined based on the future use state of the printing apparatus 11.

The control unit 30 that performs such processing functions as the maintenance content determination unit 30F. Further, the maintenance content of the printing apparatus 11 determined based on the future use state of the printing apparatus 11 corresponds to an example of the first maintenance content. When the processing ends, the control unit 30 causes the process to proceed to Step S27.

In Step S27, the control unit 30 performs confirmation request processing. In the processing, the control unit 30 transmits a confirmation request to the terminal device 13. Also, the control unit 30 transmits the acquired apparatus identification information to the terminal device 13 together with the confirmation request. In this way, the confirmation request is transmitted to the terminal device 13 that performs confirmation of the acquired apparatus identification information. When the processing ends, the control unit 30 causes the process to proceed to Step S28.

In the terminal device 13, in Step S40, the terminal control unit 40 performs confirmation request acquisition processing. In the processing, the terminal control unit 40 receives the confirmation request from the management server 12. Thereby, the terminal control unit 40 acquires the confirmation request. When the processing ends, the terminal control unit 40 causes the process to proceed to Step S41.

In Step S41, the terminal control unit 40 performs confirmation result input processing. In the processing, the terminal control unit 40 inputs a confirmation result 31E of the printing apparatus 11 from the terminal input unit 43. The confirmation result 31E is input by a confirmer who visits an installation location of the printing apparatus 11. The confirmation result 31E of the printing apparatus 11 may include a print result printed by the printing apparatus 11. When the processing ends, the terminal control unit 40 causes the process to proceed to Step S42.

In Step S42, the terminal control unit 40 performs confirmation result transmission processing. In the processing, the terminal control unit 40 transmits the confirmation result 31E of the printing apparatus 11 to the management server 12. In addition, the terminal control unit 40 transmits the apparatus identification information of the confirmed printing apparatus 11 to the management server 12 together with the confirmation result 31E of the printing apparatus 11. When the processing ends, the terminal control unit 40 causes the process to proceed to Step S43.

In the management server 12, the control unit 30 performs confirmation result acquisition processing in Step S28. In the processing, the control unit 30 receives the confirmation result 31E and the apparatus identification information from the terminal device 13. Thus, the control unit 30 acquires the confirmation result 31E and the apparatus identification information of the printing apparatus 11. In particular, the control unit 30 acquires the print result printed by the printing apparatus 11 as the confirmation result 31E of the printing apparatus 11. The control unit 30 that performs such processing functions as the confirmation result acquisition unit 30E. Then, the control unit 30 stores the confirmation result 31E in the storage unit 31. When the processing ends, the control unit 30 causes the process to proceed to Step S29.

In Step S29, the control unit 30 performs second maintenance content determination processing. In the processing, the control unit 30 determines the maintenance content of the printing apparatus 11 based on the confirmation result 31E of the printing apparatus 11.

As a specific example, when the confirmation result 31E indicating that there is an abnormality in the print result printed by the printing apparatus 11 is acquired, the control unit 30 may determine the replacement of the first component and the second component as the maintenance content. In such a case, the control unit 30 may compositely determine the first maintenance content determined in the first maintenance content determination processing and the second maintenance content as the maintenance content. In addition, the control unit 30 may cancel the first maintenance content determined in the first maintenance content determination processing and may preferentially determine the second maintenance content. The control unit 30 may cancel the second maintenance content and may preferentially determine the first maintenance content determined in the first maintenance content determination processing. When the control unit 30 acquires the confirmation result 31E indicating that there is an abnormality in the exterior, the control unit 30 may determine replacement of a component having an abnormality in the exterior as the maintenance content.

The control unit 30 that performs such processing functions as the maintenance content determination unit 30F. The maintenance content of the printing apparatus 11 determined based on the confirmation result 31E of the printing apparatus 11 corresponds to an example of the second maintenance content. That is, after the first maintenance content is determined, the control unit 30 determines the second maintenance content as the maintenance content of the printing apparatus 11 based on the confirmation result 31E of the printing apparatus 11. When the processing ends, the control unit 30 causes the process to proceed to Step S30.

In Step S30, the control unit 30 performs maintenance content storage processing. In the processing, the control unit 30 stores the determined maintenance content of the printing apparatus 11 in the storage unit 31. In particular, the control unit 30 stores the maintenance content of the printing apparatus 11 in the storage unit 31 so as to correspond to the apparatus identification information of the printing apparatus 11. When the processing ends, the control unit 30 causes the process to proceed to Step S31.

In Step S31, the control unit 30 performs maintenance content notification processing. In the processing, the control unit 30 transmits the maintenance content of the printing apparatus 11 and the apparatus identification information of the printing apparatus 11 to the terminal device 13. In addition, the control unit 30 may calculate cost information corresponding to the maintenance content of the printing apparatus 11 and may transmit the cost information to the terminal device 13. In addition, the control unit 30 may transmit the maintenance content and the cost information of the printing apparatus 11 to the printing apparatus 11 corresponding to the apparatus identification information. Thus, the control unit 30 notifies the maintenance content of the printing apparatus 11, the apparatus identification information of the printing apparatus 11, and the cost information. When the processing ends, the control unit 30 ends the second diagnostic control processing.

In the terminal device 13, in Step S43, the terminal control unit 40 performs maintenance content acquisition processing. In the processing, the terminal control unit 40 receives the maintenance content of the printing apparatus 11, the apparatus identification information of the printing apparatus 11, and the cost information of the printing apparatus 11 from the management server 12. As a result, the terminal control unit 40 acquires the maintenance content of the printing apparatus 11, the apparatus identification information of the printing apparatus 11, and the cost information of the printing apparatus 11. The management server 12 may estimate a plurality of pieces of cost information in which conditions such as the desired use period are changed. The terminal control unit 40 may acquire a plurality of pieces of cost information estimated by changing conditions such as the desired use period. As described above, when a user's approval is obtained as a result of the confirmer notifying the user of the maintenance content and the cost information of the printing apparatus 11, the maintenance of the printing apparatus 11 may be performed based on the maintenance content of the printing apparatus 11 and the apparatus identification information of the printing apparatus 11. On the other hand, when the user's approval is not obtained, the printing apparatus 11 may be collected. When the processing ends, the terminal control unit 40 ends the third diagnostic control processing.

Actions and Effects of First Embodiment

Actions and effects of the first embodiment will be described.
(1-1) The future use state of the printing apparatus 11 is predicted based on the use history 31B of the printing apparatus 11. Then, the maintenance content of the printing apparatus 11 is determined based on the prediction result of the future use state of the printing apparatus 11. Therefore, the maintenance content of the printing apparatus 11 can be determined based on the past use history 31B of the printing apparatus 11 and the future use state of the printing apparatus 11. Thus, it is possible to improve the accuracy of determining the maintenance content of the printing apparatus 11.

In particular, it is desirable to use the printing apparatus 11 for a long period of time in order to reduce an environmental load, but the risk of failure of the printing apparatus 11 needs to be reduced, and it is necessary to ensure a stable operation at least within the guarantee period. Therefore, when the future use state of the printing apparatus 11 can be predicted with high accuracy, it is possible to reduce the environmental load, to reduce the maintenance cost, and to shorten the maintenance time by performing the maintenance with the minimum necessary maintenance content without performing the redundant maintenance.

In addition, when the user is the same before and after the maintenance and the printing apparatus 11 is used under the same environment, compared to a case in which the user is different before and after the maintenance and the printing apparatus 11 is used under different environments, a possibility that the future use state of the printing apparatus 11 is rapidly changed is low. Thus, it is possible to improve the accuracy of determining the maintenance content of the printing apparatus 11.

In addition, when the same user continuously uses the printing apparatus 11, it is possible to maintain the printing apparatus 11 at the installation location of the printing apparatus 11, and it is not necessary to transport the printing apparatus 11 to and from a maintenance factory. For this reason, there is no damage (breakage, accuracy deterioration, and ink leakage and solidification due to vibration or the like) during transportation of the printing apparatus 11, a non-use period according to the transportation of the printing apparatus 11 is short, and transportation cost of the printing apparatus 11 does not occur. In addition, it is possible to reduce the environmental load according to the transportation.
(1-2) The number of passes is acquired as the use history 31B of the printing apparatus 11. Therefore, the future use state of the printing apparatus 11 can be predicted based on the past number of passes printed by the printing apparatus 11. As a result, it is possible to predict the future use state of the printing apparatus 11 in consideration of a degree of consumption due to printing. Thus, it is possible to improve the accuracy of determining the maintenance content of the printing apparatus 11.
(1-3) The energization time of the printing apparatus 11 is acquired as the use history 31B of the printing apparatus 11. Therefore, it is possible to predict the future use state of the printing apparatus 11 based on the energization time of the printing apparatus 11. As a result, it is possible to predict the future use state of the printing apparatus 11 in consideration of the degree of consumption due to energization. Thus, it is possible to improve the accuracy of determining the maintenance content of the printing apparatus 11.
(1-4) The number of passes and the energization time are acquired as the use history 31B of the printing apparatus 11. Then, the future use state of the printing apparatus 11 is predicted based on the number of passes and the energization time. Therefore, it is possible to diversify the use history 31B of the printing apparatus 11. As a result, the future use state of the printing apparatus 11 can be predicted from various perspectives. Thus, it is possible to improve the accuracy of determining the maintenance content of the printing apparatus 11.

(1-5) The maintenance content of the printing apparatus 11 is determined based on the future desired use period of the printing apparatus 11. For this reason, it is possible to determine the maintenance content of the printing apparatus 11 according to the future desired use period of the printing apparatus 11. Thus, it is possible to improve the accuracy of determining the maintenance content of the printing apparatus 11.

(1-6) It is possible to determine different maintenance content of the printing apparatus 11 according to whether the future desired use period of the printing apparatus 11 is the first desired use period or the second desired use period. For this reason, it is possible to determine the maintenance content of the printing apparatus 11 so that the maintenance content of the printing apparatus 11 varies according to the future desired use period of the printing apparatus 11. Thus, it is possible to improve the accuracy of determining the maintenance content of the printing apparatus 11.

(1-7) The future use value is predicted based on the current use value. Then, the maintenance content of the printing apparatus 11 is determined based on whether or not the future use value exceeds the threshold value 31C. For this reason, it is possible to determine the maintenance content of the printing apparatus 11 based on whether or not the future use value predicted based on the current use value exceeds the threshold value 31C. Therefore, the future use value can be predicted based on the past use value using the same scale of use values. Thus, it is possible to improve the accuracy of determining the maintenance content of the printing apparatus 11.

(1-8) The maintenance content of the printing apparatus 11 is determined based on the confirmation result 31E of the printing apparatus 11. Therefore, it is possible to determine the maintenance content of the printing apparatus 11 based on not only the use history 31B of the printing apparatus 11 but also the confirmation result 31E of the printing apparatus 11 confirmed by the confirmer. Thus, it is possible to improve the accuracy of determining the maintenance content of the printing apparatus 11.

(1-9) The first maintenance content is determined as the maintenance content of the printing apparatus 11 based on the future use state of the printing apparatus 11. After the first maintenance content is determined, the second maintenance content is determined as the maintenance content of the printing apparatus 11 based on the confirmation result 31E of the printing apparatus 11. Therefore, the first maintenance content based on the future use state of the printing apparatus 11 and the second maintenance content based on the confirmation result 31E of the printing apparatus 11 can be determined in a stepwise manner. Thus, it is possible to quickly determine the first maintenance content even before the confirmer visits the installation location of the printing apparatus 11. Therefore, it is possible to efficiently determine the maintenance content of the printing apparatus 11.

(1-10) The print result printed by the printing apparatus 11 is acquired as the confirmation result 31E of the printing apparatus 11. Therefore, the maintenance content of the printing apparatus 11 can be determined based on the actual print result printed by the printing apparatus 11. Thus, it is possible to improve the accuracy of determining the maintenance content of the printing apparatus 11.

Second Embodiment

Next, a second embodiment will be described. In the second embodiment, the maintenance content of the printing apparatus 11 is determined based on use environment information in which the printing apparatus 11 is installed. In the following description, the same configurations as those of the already described embodiment are denoted by the same reference signs, and redundant descriptions thereof will be omitted or simplified.

Diagnostic Control Processing

Figure 12:
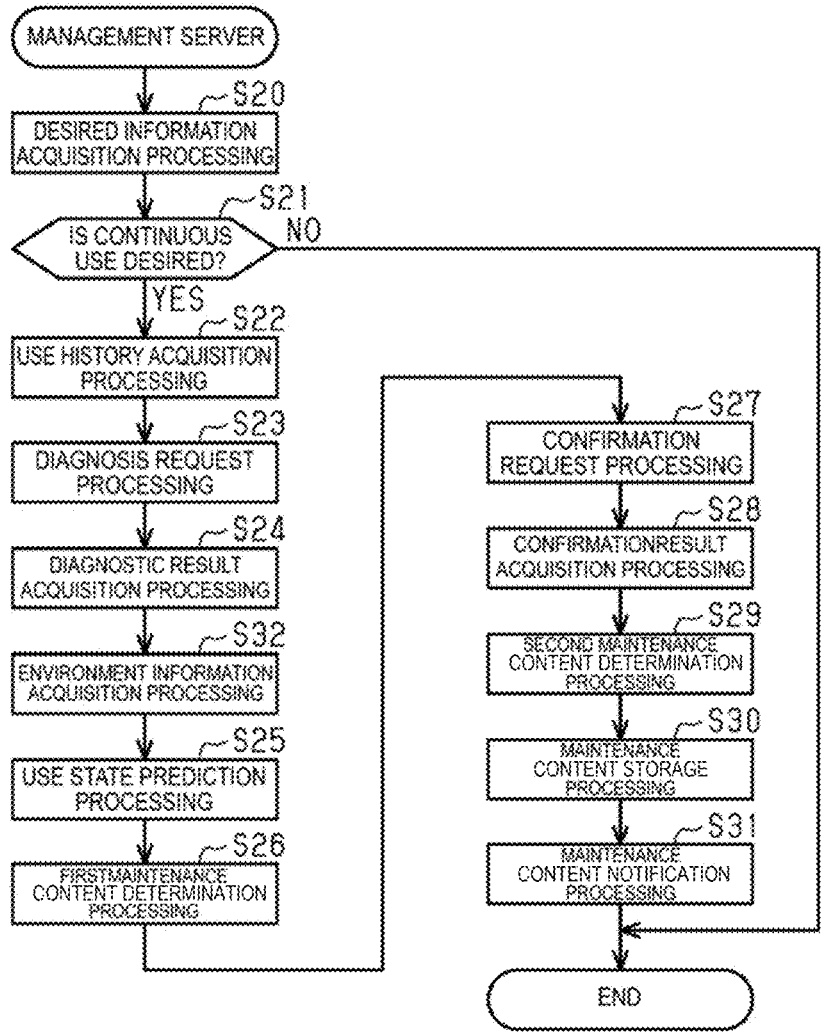
FIG. 12 is a flowchart illustrating the diagnostic control processing.

As illustrated in FIG. 12, in the management server 12, when Step S24 of the diagnostic control processing ends, in Step S32, the control unit 30 performs environment information acquisition processing. In the processing, the control unit 30 reads the use environment information corresponding to the apparatus identification information from the storage unit 31 and acquires the use environment information. The use environment information may include, for example, standard environment information and high temperature environment information. The high temperature environment information is information indicating that the printing apparatus 11 is being used in a higher temperature environment than the standard environment information. The use environment information may be preset in the storage unit 31 so as to correspond to the apparatus identification information. The printing apparatus 11 may include a detection unit that detects the environment information, and the use environment information may be acquired from the printing apparatus 11 based on a detection result of the detection unit. In this way, the control unit 30 acquires the use environment information of the printing apparatus 11 as the use history 31B of the printing apparatus 11. The control unit 30 that performs such processing functions as an example of the use history acquisition unit 30B. When the processing ends, the control unit 30 causes the process to proceed to Step S25.

In Step S26, the control unit 30 determines the maintenance content of the printing apparatus 11 based on the use environment information. In particular, the control unit 30 predicts the future use state of the printing apparatus 11 based on the threshold value 31C corresponding to the use environment information.

As a specific example, the determination table may include a third determination table. In the third determination table, the threshold value 31C according to the number of passes are set as in the first determination table, but the threshold value 31C itself according to the number of passes is set differently from the first determination table.

The determination table may include a fourth determination table. In the fourth determination table, the threshold value 31C corresponding to the energization time is set similarly to the second determination table, but the threshold value 31C itself according to the energization time is set differently from the second determination table.

As described above, the threshold value 31C corresponding to the use environment information of the printing apparatus 11 is set. In particular, the threshold value 31C corresponding to the high temperature environment information is set to be lower than the threshold value 31C corresponding to the standard environment information.

Then, the control unit 30 may refer to the determination table corresponding to the use environment information and determine the maintenance content of the printing apparatus 11 based on whether or not the future use value exceeds the threshold value 31C corresponding to the use environment information.

Actions and Effects of Second Embodiment

Actions and effects of the second embodiment will be described.
(2-1) The use environment information of the printing apparatus 11 is acquired as the use history 31B of the printing apparatus 11. Therefore, the future use state of the printing apparatus 11 can be predicted based on the use environment information of the printing apparatus 11. Thus, it is possible to predict the future use state of the printing apparatus 11 in consideration of the use environment. Therefore, it is possible to improve the accuracy of determining the maintenance content of the printing apparatus 11.

Third Embodiment

Figure 13:
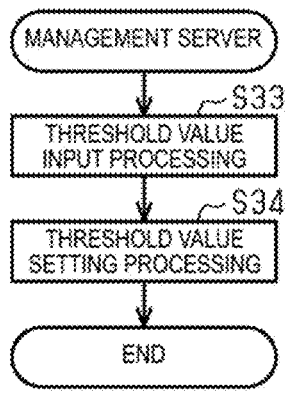
FIG. 13 is a flowchart illustrating threshold value control processing.

Next, a third embodiment will be described. In the third embodiment, the threshold value is set to be changeable. In the third embodiment, in the management server 12, the control unit 30 performs threshold value control processing illustrated in FIG. 13 at predetermined intervals.
Threshold Value Control Processing
As illustrated in FIG. 13, in Step S33, the control unit 30 performs threshold value input processing. In the processing, the control unit 30 inputs the threshold value 31C in response to an operation by the administrator. The input of the threshold value 31C may be performed in response to an operation of an input unit coupled to the management server 12, or may be performed through communication with the terminal device 13. When the processing ends, the control unit 30 causes the process to proceed to Step S34.

In Step S34, the control unit 30 performs threshold value setting processing. In the processing, the control unit 30 stores the input threshold value 31C in the storage unit 31. As a result, the control unit 30 sets the threshold value 31C to be changeable. The control unit 30 that performs such processing functions as an example of the threshold value setting unit 30G.

Actions and Effects of Third Embodiment

Actions and effects of the third embodiment will be described.
(3-1) The threshold value 31C are set to be changeable. Therefore, the accuracy of the threshold value 31C can be improved by repeatedly examining the future use state of the printing apparatus 11 and verifying the maintenance result of the printing apparatus 11. Then, it is possible to determine the maintenance content of the printing apparatus 11 using the highly accurate threshold value 31C. Therefore, it is possible to improve the accuracy of determining the maintenance content of the printing apparatus 11.

Modified Examples

The embodiment can be modified and implemented as follows. The embodiment and the following modified examples can be combined and implemented insofar as no technical contradictions arise.
The control unit 30 may input whether or not a component should be replaced as the use state of the printing apparatus 11 in accordance with an operation of the administrator even when the threshold value itself is not input. In this case, the control unit 30 may generate the threshold value itself based on a relationship between the use history 31B of the printing apparatus 11 and whether or not the component should be replaced.

The use history 31B of the printing apparatus 11 may include the use history 31B related to printing of the printing apparatus 11. The use history 31B related to printing may include the amount of printing performed by the printing apparatus 11. The amount of printing performed by the printing apparatus 11 may include at least one of a cumulative print area, a cumulative amount of use of a liquid, and a cumulative print time, in addition to the number of passes.

The use history 31B of the printing apparatus 11 may include a use history 31B related to transportation of a medium. The use history 31B related to transportation of the medium may include at least one of a cumulative transport distance by which the medium has been transported and the cumulative number of transported media.

The use history 31B of the printing apparatus 11 may include an elapsed time from initial filling of the liquid. The use history 31B of the printing apparatus 11 may include the number of times the opening and closing cover is opened and closed. The use history 31B of the printing apparatus 11 may include the number of times a distance between the head 22 and the support unit is adjusted. The use history 31B of the printing apparatus 11 may include a cumulative amount of waste liquid discharged from the head 22. The use history 31B of the printing apparatus 11 may include the number of times of replacement of the head 22.

The diagnostic result 31D of the printing apparatus 11 may include an abnormality based on a driving pulse when a roller drive unit (not illustrated) is driven.

The confirmation result 31E of the printing apparatus 11 may include, for example, an abnormality in an exterior of a physical configuration of an opening and closing knob an opening and closing lever, or the like.

The use environment information of the printing apparatus 11 may include low temperature environment information. The low temperature environment information is information indicating that the printing apparatus 11 is being used in a lower temperature environment than the standard environment information. The use environment information of the printing apparatus 11 may include dust environment information in addition to the information related to temperature. The dust environment information is information indicating that the printing apparatus 11 is being used in an environment in which dust flows more than in the standard environment information.

The diagnostic condition may be satisfied when the number of passes exceeds the third pass number threshold value PT13 based on the use history 31B of the printing apparatus 11. The diagnostic condition may be satisfied when the number of passes exceeds the third pass number threshold value PT13 based on the use history 31B of the printing apparatus 11 even before the use period becomes a predetermined period. The diagnostic condition may be satisfied when the number of passes does not exceed the third pass number threshold value PT13 based on the use history 31B of the printing apparatus 11 and the use period reaches a predetermined period. The diagnostic condition may be satisfied again when the desired use period is reached even after the use period reaches the predetermined period.

That is, the diagnostic condition may be satisfied when the use period becomes any one of a plurality of types of predetermined periods.

The use prediction graphs 50B to 53B may be generated based on a part of the most recent period in which the diagnostic condition is satisfied among the use history graphs 50A to 53A. The replacement prediction graphs 50C to 53C may be generated based on a part of the most recent period in which the diagnostic condition is satisfied among the use history graphs 50A to 53A. That is, the control unit 30 may predict the future use value based on the use history 31B of a part of the most recent period in the use history 31B of the printing apparatus 11. A part of the most recent period may be a predetermined period such as one year. For example, a future use value may be predicted based on the use history 31B of previous monthly use.

When the future use value at a required timing can be predicted based on the current use value, the use history graph 50A to 53A, the use prediction graph 50B to 53B, or the replacement prediction graph 50C to 53C may not be actually graphed. It is sufficient as long as it is possible to calculate the future use value that can be compared with the threshold value.

The control unit 30 may predict the future use state of the printing apparatus 11 based on the diagnostic result 31D. That is, the control unit 30 may determine the first maintenance content of the printing apparatus 11 based on the diagnostic result 31D.

When the diagnostic condition is satisfied and the number of passes has already exceeded the third pass number threshold value PT13, the control unit 30 may control the printing apparatus 11 to be collected. That is, the control unit 30 may perform control such that the printing apparatus 11 is collected based on the use history 31B of the printing apparatus 11 regardless of the desired use information.

When the use value corresponding to the desired use period exceeds the threshold value 31C, the control unit 30 may recommend shortening of the desired use period based on the replacement prediction graphs 50C to 53C. As a specific example, in the case illustrated in FIG. 8, when the control unit 30 acquires a period from the timing indicated by the reference sign T1 to the timing indicated by the reference sign T3 as the desired use period, the control unit 30 may recommend the period from the timing indicated by the reference sign T1 to the timing indicated by the reference sign T2 as the use period.

The control unit 30 may determine the maintenance content for the same component based on the number of passes and the energization time as the use history 31B of the printing apparatus 11.

The control unit 30 may determine an item to be confirmed by the confirmer based on the use history 31B of the printing apparatus 11. The control unit 30 may determine the item to be confirmed by the confirmer based on the predicted future use state of the printing apparatus 11. The control unit 30 may determine the item to be confirmed by the confirmer based on the diagnostic result 31D of the printing apparatus 11. The control unit 30 may determine the item to be confirmed by the confirmer based on the determined first maintenance content.

The control unit 30 may determine the first maintenance content and the second maintenance content in any order. That is, the control unit 30 may determine the first maintenance content after the second maintenance content is determined. Further, the control unit 30 may determine the maintenance content without dividing the maintenance content into the first maintenance content and the second maintenance content.

The control unit 30 may compositely determine the maintenance content based on a combination of at least one of the use history 31B of the printing apparatus 11, the desired use period of the printing apparatus 11, the diagnostic result 31D of the printing apparatus 11, and the confirmation result 31E of the printing apparatus 11.

Priorities for determining the maintenance content may be defined based on a combination of at least one of the use history 31B of the printing apparatus 11, the desired use period of the printing apparatus 11, the diagnostic result 31D of the printing apparatus 11, and the confirmation result 31E of the printing apparatus 11. The priorities for determining the maintenance content may not be defined based on a combination of at least one of the use history 31B of the printing apparatus 11, the desired use period of the printing apparatus 11, the diagnostic result 31D of the printing apparatus 11, and the confirmation result 31E of the printing apparatus 11.

The terminal device 13 may instruct the printing apparatus 11 to diagnose the printing apparatus 11. The terminal device 13 may receive a diagnosis request from the management server 12. When the terminal device 13 receives the diagnosis request from the management server 12, the terminal device 13 may instruct the printing apparatus 11 to diagnose the printing apparatus 11.

As the terminal device 13, the terminal device 13 to which the confirmation result 31E of the printing apparatus 11 is input and the terminal device 13 to which the maintenance content of the printing apparatus 11 is notified may be different devices.

The maintenance control system 10 may not include the printing apparatus 11. The maintenance control system 10 may not include the terminal device 13. The maintenance control system 10 may not include the management server 12. In this case, in the maintenance control system 10, the terminal device 13 may have the function of the management server 12. That is, the terminal device 13 may be an example of the maintenance control device.

Although the printing apparatus 11 is employed as a maintenance target, the present disclosure is not limited thereto, and for example, an image reading apparatus may be employed as the maintenance target. The image reading apparatus includes a reading unit capable of reading an image from a document. In addition, for example, an electronic apparatus such as a projector may be employed as the maintenance target.

As used herein, the phrase "at least one of" means one or more of specific alternatives. As an example, the phrase "at least one of" as used herein means only one alternative or both of two alternatives, when the number of alternatives is two. As another example, the phrase "at least one of" as used herein means only one alternative, or any combination of two or more alternatives, when the number of alternatives is three or more.

Supplementary Description

Hereinafter, technical concepts and effects thereof that are understood from the above-described exemplary embodiments and modified examples are described.

(A) A maintenance control device includes: a use history acquisition unit configured to acquire a use history of a printing apparatus; a use state prediction unit configured to predict a future use state of the printing apparatus based on the use history of the printing apparatus acquired by the use history acquisition unit, and a maintenance content determination unit configured to determine a maintenance content of the printing apparatus based on a prediction result predicted by the use state prediction unit.

With such a configuration, it is possible to determine the maintenance content of the printing apparatus based on the past use history of the printing apparatus and the future use state of the printing apparatus. Therefore, it is possible to improve the accuracy of determining the maintenance content of the printing apparatus.

(B) A maintenance control system includes: a use history acquisition unit configured to acquire a use history of a printing apparatus; a use state prediction unit configured to predict a future use state of the printing apparatus based on the use history of the printing apparatus acquired by the use history acquisition unit, and a maintenance content determination unit configured to determine a maintenance content of the printing apparatus based on a prediction result predicted by the use state prediction unit. With such a configuration, the same effects as for (A) can be obtained.

(C) In a maintenance control method, one or more computers perform: acquiring a use history of a printing apparatus, predicting a future use state of the printing apparatus based on the use history of the printing apparatus, and determining a maintenance content of the printing apparatus based on the future use state of the printing apparatus. With such a configuration, the same effect as (A) can be obtained.

(D) In the maintenance control method, the one or more computers may perform acquiring an amount of printing performed by the printing apparatus as the use history of the printing apparatus.

With such a configuration, it is possible to predict the future use state of the printing apparatus based on the past amount of printing performed by the printing apparatus. Accordingly, it is possible to predict the future use state of the printing apparatus in consideration of a degree of consumption due to printing. Therefore, it is possible to improve the accuracy of determining the maintenance content of the printing apparatus.

(E) In the maintenance control method, the one or more computers may perform acquiring an energization time of the printing apparatus as the use history of the printing apparatus.

With such a configuration, it is possible to predict the future use state of the printing apparatus based on the energization time of the printing apparatus. Accordingly, it is possible to predict the future use state of the printing apparatus in consideration of the degree of consumption due to energization. Therefore, it is possible to improve the accuracy of determining the maintenance content of the printing apparatus.

(F) In the maintenance control method, the one or more computers may perform acquiring use environment information of the printing apparatus as the use history of the printing apparatus.

With such a configuration, it is possible to predict the future use state of the printing apparatus based on the use environment information of the printing apparatus. Thus, it is possible to predict the future use state of the printing apparatus in consideration of the use environment. Therefore, it is possible to improve the accuracy of determining the maintenance content of the printing apparatus.

(G) In the maintenance control method, the one or more computers may perform acquiring, as the use history of the printing apparatus, a first use history and a second use history different from the first use history, and predicting a future use state of the printing apparatus based on the first use history and the second use history.

With such a configuration, it is possible to obtain a variety of use histories. As a result, the future use state of the printing apparatus can be predicted from various perspectives. Therefore, it is possible to improve the accuracy of determining the maintenance content of the printing apparatus.

(H) In the maintenance control method, the one or more computers may perform acquiring a future desired use period of the printing apparatus, and determining the maintenance content of the printing apparatus based on the future desired use period of the printing apparatus.

With such a configuration, it is possible to determine the maintenance content of the printing apparatus according to the future desired use period of the printing apparatus. Therefore, it is possible to improve the accuracy of determining the maintenance content of the printing apparatus. (I) In the maintenance control method, the one or more computers may perform determining different maintenance contents of the printing apparatus when the future desired use period of the printing apparatus is a first desired use period and when the future desired use period is a second desired use period different from the first desired use period.

With such a configuration, it is possible to determine the maintenance content of the printing apparatus so that the maintenance content of the printing apparatus varies according to the future desired use period of the printing apparatus. Therefore, it is possible to improve the accuracy of determining the maintenance content of the printing apparatus.

(J) In the maintenance control method, the one or more computers may perform acquiring a current use value related to use of the printing apparatus as the use history of the printing apparatus, predicting a future use value related to use of the printing apparatus as the future use state of the printing apparatus based on the current use value, and determining the maintenance content of the printing apparatus based on whether or not the future use value exceeds a threshold value.

With such a configuration, it is possible to predict the future use value related to the use of the printing apparatus based on the current use value related to the use of the printing apparatus. Then, it is possible to determine the maintenance content of the printing apparatus based on whether or not the predicted future use value exceeds the threshold value. Thus, the future use value can be predicted based on the past use value using the same scale of use values. Therefore, it is possible to improve the accuracy of determining the maintenance content of the printing apparatus.

(K) In the maintenance control method, the one or more computers may perform changeably setting the threshold value changeable.

With such a configuration, the threshold can be changed. For this reason, it is possible to increase the accuracy of the threshold value by repeatedly verifying the maintenance result of the printing apparatus, and it is possible to determine the maintenance content of the printing apparatus using the highly accurate threshold value. Therefore, it is possible to improve the accuracy of determining the maintenance content of the printing apparatus.

(L) In the maintenance control method, the one or more computers may perform acquiring a confirmation result of the printing apparatus confirmed by a confirmer, and determining the maintenance content of the printing apparatus based on the confirmation result of the printing apparatus.

With such a configuration, it is possible to determine the maintenance content of the printing apparatus based on not only the use history of the printing apparatus but also the confirmation result of the printing apparatus confirmed by the confirmer. Therefore, it is possible to improve the accuracy of determining the maintenance content of the printing apparatus.

(M) In the maintenance control method, the one or more computers may perform determining a first maintenance content as the maintenance content of the printing apparatus based on a future use state of the printing apparatus, and determining a second maintenance content as the maintenance content of the printing apparatus based on a confirmation result of the printing apparatus after the first maintenance content is determined.

With such a configuration, the first maintenance content based on the future use state of the printing apparatus and the second maintenance content based on the confirmation result of the printing apparatus can be determined in a stepwise manner. Thus, even before the confirmer visits an installation location of the printing apparatus, the first maintenance content can be quickly determined. Therefore, it is possible to efficiently determine the maintenance content of the printing apparatus.

(N) In the maintenance control method, the one or more computers may perform acquiring a print result printed by the printing apparatus as the confirmation result of the printing apparatus. With such a configuration, it is possible to determine the maintenance content of the printing apparatus based on the actual print result printed by the printing apparatus. Therefore, it is possible to improve the accuracy of determining the maintenance content of the printing apparatus.

(O) A program causes one or more computers to perform acquiring a use history of a printing apparatus, predicting a future use state of the printing apparatus based on the use history of the printing apparatus, and determining a maintenance content of the printing apparatus based on the future use state of the printing apparatus. With such a configuration, the same effects as for (A) can be obtained.

What is claimed is:

1. A maintenance control device comprising:
one or more processors programmed to perform operations comprising:
acquiring a use history of a printing apparatus;
predicting a future use state of the printing apparatus based on the use history of the printing apparatus;
determining a maintenance content of the printing apparatus based on a prediction result;
acquiring a use period of the printing apparatus;
acquiring a future desired use period of the printing apparatus; and
determining the maintenance content of the printing apparatus based on the future desired use period of the printing apparatus;
wherein determining the maintenance content comprises determining different maintenance contents of the printing apparatus between a case when the future desired use period of the printing apparatus is a first desired use period and a case when the future desired use period of the printing apparatus is a second desired use period different from the first desired use period.

2. A maintenance control system comprising:
one or more processors programmed to perform operations comprising:
acquiring a use history of a printing apparatus;
predicting a future use state of the printing apparatus based on the use history of the printing apparatus;
determining a maintenance content of the printing apparatus based on a prediction result;
acquiring a use period of the printing apparatus;
acquiring a future desired use period of the printing apparatus; and
determining the maintenance content of the printing apparatus based on the future desired use period of the printing apparatus;
wherein determining the maintenance content comprises determining different maintenance contents of the printing apparatus between a case when the future desired use period of the printing apparatus is a first desired use period and a case when the future desired use period of the printing apparatus is a second desired use period different from the first desired use period.

3. A maintenance control method that causes one or more computers to perform:
acquiring a use history of a printing apparatus;
predicting a future use state of the printing apparatus based on the use history of the printing apparatus;
determining a maintenance content of the printing apparatus based on the future use status of the printing apparatus;
acquiring a use period of the printing apparatus;
acquiring a future desired use period of the printing apparatus; and
determining the maintenance content of the printing apparatus based on the future desired use period of the printing apparatus;
wherein the one or more computers are configured to determine different maintenance contents of the printing apparatus between a case when the future desired use period of the printing apparatus is a first desired use period and a case when the future desired use period of the printing apparatus is a second desired use period different from the first desired use period.

4. The maintenance control method according to claim 3, wherein the one or more computers perform acquiring an amount of printing performed by the printing apparatus as the use history of the printing apparatus.

5. The maintenance control method according to claim 3, wherein the one or more computers perform acquiring an energization time of the printing apparatus as the use history of the printing apparatus.

6. The maintenance control method according to claim 3, wherein the one or more computers perform acquiring use environment information of the printing apparatus as the use history of the printing apparatus.

7. The maintenance control method according to claim 3, wherein the one or more computers perform:
acquiring, as the use history of the printing apparatus, a first use history and a second use history different from the first use history; and
predicting the future use state of the printing apparatus based on the first use history and the second use history.

8. The maintenance control method according to claim 3, wherein the one or more computers perform:
   acquiring a current use value related to use of the printing apparatus as the use history of the printing apparatus;
   predicting a future use value related to the use of the printing apparatus as the future use state of the printing apparatus based on the current use value; and
   determining the maintenance content of the printing apparatus based on whether or not the future use value exceeds a threshold value.

9. The maintenance control method according to claim 8, wherein the one or more computers changeably set the threshold value.

10. The maintenance control method according to claim 3, wherein the one or more computers perform:
    acquiring a confirmation result of the printing apparatus confirmed by a confirmer; and
    determining the maintenance content of the printing apparatus based on the confirmation result of the printing apparatus.

11. The maintenance control method according to claim 10, wherein the one or more computers perform:
    determining a first maintenance content as the maintenance content of the printing apparatus based on the future use state of the printing apparatus; and
    determining a second maintenance content as the maintenance content of the printing apparatus based on the confirmation result of the printing apparatus after the first maintenance content is determined.

12. The maintenance control method according to claim 10, wherein the one or more computers perform acquiring a print result printed by the printing apparatus as the confirmation result of the printing apparatus.

13. A non-transitory computer-readable storage medium storing a program that causes one or more computers to perform:
    acquiring a use history of a printing apparatus;
    predicting a future use state of the printing apparatus based on the use history of the printing apparatus;
    determining a maintenance content of the printing apparatus based on the future use state of the printing apparatus;
    acquiring a use period of the printing apparatus;
    acquiring a future desired use period of the printing apparatus; and
    determining the maintenance content of the printing apparatus based on the future desired use period of the printing apparatus;
    wherein determining the maintenance content comprises determining different maintenance contents of the printing apparatus between a case when the future desired use period of the printing apparatus is a first desired use period and a case when the future desired use period of the printing apparatus is a second desired use period different from the first desired use period.

* * * * *